United States Patent
Shibata et al.

(10) Patent No.: US 6,217,687 B1
(45) Date of Patent: Apr. 17, 2001

(54) PROCESSES FOR TREATING A SURFACE OF A THERMOPLASTIC RESIN FILM

(75) Inventors: Ayako Shibata; Nobuhiro Shibuya, both of Ibaraki (JP)

(73) Assignee: Oji-Yuka Synthetic Paper Co., Ltd., Tokyo (JP)

( * ) Notice: Subject to any disclaimer, the term of this patent is extended or adjusted under 35 U.S.C. 154(b) by 0 days.

(21) Appl. No.: 09/285,389

(22) Filed: Apr. 2, 1999

(30) Foreign Application Priority Data

Apr. 3, 1998 (JP) .................................................. 10-107178

(51) Int. Cl.$^7$ ........................... B29C 55/12; B29C 71/04; B32B 31/00
(52) U.S. Cl. ............................ 156/82; 156/229; 156/242; 156/272.2; 156/272.6; 264/80; 264/83; 264/129; 264/134; 264/289.3; 264/290.2; 264/479; 264/480; 264/483; 427/223; 427/322; 427/412.1; 427/412.3; 427/533; 427/569

(58) Field of Search ................................ 264/80, 83, 129, 264/134, 289.3, 290.2, 479, 480, 483; 156/82, 229, 242, 272.2, 272.6; 427/223, 322, 412.1, 412.3, 533, 569

(56) References Cited

U.S. PATENT DOCUMENTS 3,286,009 * 11/1966 Yumoto et al. ....................... 264/129
3,773,609 * 11/1973 Haruta et al. ..................... 156/229 X
4,000,102 * 12/1976 Shima et al. ..................... 264/479 X

* cited by examiner

*Primary Examiner*—Leo B. Tentoni
(74) *Attorney, Agent, or Firm*—Oblon, Spivak, McClelland, Maier & Neustadt, P.C.

(57) ABSTRACT

A process for treating a surface of a thermoplastic resin film (i) which includes subjecting the surface of the thermoplastic resin film (i) to a first oxidation treatment, coating the oxidized surface with a surface modifier, subsequently stretching the film, subjecting that surface of the thermoplastic resin film (i) which has been coated with the surface modifier to a second oxidation treatment, and then coating the oxidized surface with a surface modifier.

20 Claims, No Drawings

PROCESSES FOR TREATING A SURFACE OF A THERMOPLASTIC RESIN FILM

BACKGROUND OF THE INVENTION

1. Field of the Invention

The present invention relates to processes for treating a surface of a thermoplastic resin film which comprise subjecting the film surface to successive oxidation and coating treatments and stretching said coated film, followed by second oxidation and coating treatments, to thereby obtain a treated film which has satisfactory ink transferability and adhesion thereto and long-term stability and shows excellent printability.

The thermoplastic resin films obtained by the present invention are useful as the materials of stickers for outdoor advertisement, labels for frozen food containers, and namers (labels showing directions for use and other notes) to be applied to industrial products.

2. Discussion of the Background

Coat paper has hitherto been used as stickers for outdoor advertisement and labels to be applied to containers for frozen foods. Since coat paper has poor water resistance, the coat paper for use as the material of such stickers and labels has been further coated with a polyester film in order to enhance the water resistance thereof.

Recently, thermoplastic resin films having satisfactory water resistance, in particular polyolefin synthetic papers, are attracting attention as promising label material substitutes for the coat paper coated with a polyester film.

Such resin films are known. For details, reference may be made to, e.g., JP-B-46-40794 (the term "JP-B" as used herein means an "examined Japanese patent publication"), JP-B-49-1782, JP-A-56-118437 (the term "JP-A" as used herein means an "unexamined published Japanese patent application"), JP-A-57-12642, and JP-A-57-56224.

Because the polyolefins used as materials for such polyolefin synthetic papers are nonpolar, these synthetic papers do not always have satisfactory printability and processability. The polyolefin synthetic papers are hence usually subjected to an appropriate surface treatment before use.

Known among methods for such surface treatment is a technique in which a polyolefin film in a process for polyolefin synthetic paper production is stretched and a surface of the stretched film is subjected to an oxidation treatment and then coated with a coating agent. Corona discharge treatment, flame treatment, and the like are known as this oxidation treatment. Known coating agents for the above use include the primers (coating agents) based on polyethyleneimine or an ethyleneimine/ethylene urea copolymer as described in JP-B-40-12302, JP-B-53-6676, and JP-A-57-149363 and the cationic antistatic agents and amphoteric antistatic agents as disclosed in JP-A-50-161478, JP-B-59-27769, and JP-B-2-2910.

For example, JP-B-2-2910 discloses a water-soluble coating composition comprising: a water-soluble polymer obtained by preparing a polymer from a monomer represented by $CH_2=CR^1-COOANR^3R^4$ (wherein $R^1$ represents a hydrogen atom or a methyl group; $R^3$ and $R^4$ each represents a hydrogen atom or an alkyl group having 1 or 2 carbon atoms; and A represents an alkylene group having 2 to 6 carbon atoms), a monomer represented by $CH_2=CR^1-COOR^2$ (wherein $R^1$ is as defined above and $R^2$ represents an alkyl group having 1 to 8 carbon atoms), and other hydrophobic vinyl monomers and quaternizing the tertiary nitrogen atoms of the polymer with a cationizing agent to make the polymer amphoteric; a water-soluble polyaminepolyamide-epichlorohydrin adduct; and a polyethyleneimine compound.

JP-A-53-8380 discloses an electrically conducting agent having an antistatic effect which comprises a polymer having repeating units represented by the following general formula (I):

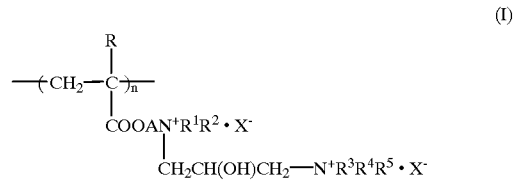

[wherein R represents a hydrogen atom or a methyl group, $R^1$ and $R^2$ each represents a methyl group or an ethyl group; $R^3$, $R^5$ each represents a methyl group, an ethyl group, $-(-CH_2-CH_2-O-)_m-H$ (wherein m is an integer of 1 to 4), or a benzyl group; R represents an alkyl group having 1 to 18 carbon atoms, an alkenyl group, or $-(-CH_2-CH_2-O-)_p-H$ (wherein p is an integer of 1 to 4), $X^-$ represents a halide ion; A represents a substituted or unsubstituted alkylene group; and n represents an integer usually ranging from $10^1$ to $10^4$].

Such techniques in which a stretched film is subjected to an oxidation treatment and coated with a primer or an antistatic agent give prints sufficiently withstanding practical use when the film is printed immediately after the coating film formation thereon. However, if the surface-treated polyolefin resin film to be printed is one which has been stored in a high-temperature high-humidity atmosphere or one which was produced at least one year before, printing on the film especially with an ultraviolet-curing ink (UV ink) or an offset ink may result in ink transfer failures or in such poor ink adhesion that the prints obtained do not withstand practical use.

A printing film intended to have improved adhesion of ultraviolet-curing inks thereto has therefore been proposed. This film is a thermoplastic resin film with excellent printability which is obtained by coating a polyolefin resin film with an aqueous solution of an alkyl-modified ethyleneimine polymer as a primer and drying the applied solution to form a coating layer (see JP-A-1-141736).

However, the above primed printing film, when stored in a high-temperature high-humidity atmosphere, often becomes insufficient in the transferability and adhesion of ultraviolet-curing inks thereto, although it initially is excellent in these properties.

An object of the present invention is to provide a thermoplastic resin film which has antistatic properties and water resistance and is satisfactory in the transferability and adhesion of ultraviolet-curing inks thereto even after storage in a high-temperature high-humidity atmosphere.

SUMMARY OF THE INVENTION

The present invention has been accomplished specifically by the following means.

According to one embodiment, is (A) a process for treating a surface of a thermoplastic resin film (i) which comprises subjecting the surface of a thermoplastic resin film (i) to a first oxidation treatment, coating the oxidized surface with a surface modifier, subsequently stretching the film, subjecting that surface of the thermoplastic resin film (i) which has been coated with the surface modifier to a second oxidation treatment, and then coating the oxidized surface with a surface modifier.

According to a second embodiment, is (B) the process for surface treatment as described in (A) wherein the thermoplastic resin film (i) is a multilayered resin film obtained by stretching a base layer (ii) comprising a thermoplastic resin in the machine direction and then laminating a surface layer (iii) comprising a thermoplastic resin to at least one side of the base layer (ii) and which comprises subjecting the surface of the multilayered resin film to a first oxidation treatment, coating the oxidized surface with a surface modifier, subsequently stretching the film in the transverse direction, subjecting that surface of the thermoplastic resin film (i) which has been coated with the surface modifier to a second oxidation treatment, and then coating the oxidized surface with a surface modifier.

According to a third embodiment, is (C) the process for surface treatment as described in (A) wherein the thermoplastic resin film (i) is a multilayered resin film obtained by laminating a surface layer (iii) comprising a thermoplastic resin to at least one side of a base layer (ii) comprising a thermoplastic resin, and which comprises subjecting a surface of said multilayered resin film to a first oxidation treatment, coating said oxidized surface with a surface modifier, subsequently stretching said film in the machine direction, subjecting said surface which has been coated with said surface modifier to a second oxidation treatment, and then coating said oxidized surface with a surface modifier.

According to a fourth embodiment, is (D) the process for surface treatment as described in (B) or (C) wherein the thermoplastic resin film (i) is a multilayered resin film comprising a base layer (ii) comprising from 40 to 100 wt % thermoplastic resin and from 60 to 0 wt % fine inorganic particles and a surface layer (iii) comprising from 25 to 100 wt % thermoplastic resin and from 75 to 0 wt % fine inorganic particles.

According to a fifth embodiment, is (E) a process for treating a surface of a thermoplastic resin film (i) which is a multilayered resin film comprising a base layer (ii) comprising from 40 to 1 00 wt % polyolefin resin and from 60 to 0 wt % fine inorganic particles and a surface layer (iii) comprising from 25 to 100 wt % polyolefin resin and from 75 to 0 wt % fine inorganic particles, said process comprising subjecting the surface of the thermoplastic resin film (i) to an oxidation treatment, subsequently coating the oxidized surface with a surface modifier, and then stretching the film.

According to a sixth embodiment, is (F) a process for treating a surface of a thermoplastic resin film (i) which is a multilayered resin film comprising a base layer (ii) comprising from 40 to 100 wt % polyolefin resin and from 60 to 0 wt % fine inorganic particles and a surface layer (iii) comprising from 25 to 100 wt % polyolefin resin and from 75 to 0 wt % fine inorganic particles, said process comprising subjecting the surface of the thermoplastic resin film (i) to a first oxidation treatment, coating the oxidized surface with a surface modifier, subsequently stretching the film, and then subjecting that surface of the multilayered resin film (i) which has been coated with the surface modifier to a second oxidation treatment.

According to a seventh embodiment, is (G) the process for surface treatment as described in any one of (D) to (F) wherein the thermoplastic resin film (i) has a void content as defined by the following equation of from 10 to 60%:

$$\text{Void content (\%)} = 100 \times (\rho_0 - \rho)/\rho_0$$

$\rho_0$: density of the unstretched resin film
$\rho$: density of the stretched resin film.

According to an eighth embodiment, is (H) the process for surface treatment as described in any one of (A) to (D) wherein said thermoplastic resin is a polyolefin resin.

According to a ninth embodiment, is (I) the process for surface treatment as described in (E), (F), or (H) wherein said polyolefin resin is a propylene resin.

According to an eleventh embodiment, is (J) the process for surface treatment as described in any one of (A) to (I) wherein the oxidation treatment is a treatment selected from the group consisting of corona discharge treatment, flame treatment, plasma treatment, glow discharge treatment, and ozone treatment.

According to a twelfth embodiment, is (K) the process for surface treatment as described in any one of (A) to (J) wherein the oxidation treatment is corona discharge treatment conducted at an energy of from 10 to 200 W×min/m² or flame treatment conducted at an energy of from 8,000 to 200,000 J/m².

According to a thirteenth embodiment, is (L) the process for surface treatment as described in any one of (A) to (K) wherein the surface modifier comprises a primer or a combination of a primer and an antistatic polymer.

By subjecting a surface of a stretchable thermoplastic resin film (i) to a first oxidation treatment and coating the oxidized surface with a surface modifier, the effect of a second oxidation treatment to be conducted after stretching is enhanced and the wettability by and the adhesion of a surface modifier to be applied thereafter are improved accordingly. Consequently, the thermoplastic resin film (i) obtained by the surface treatment processes of the present invention can have satisfactory transferability and adhesion of ultraviolet-curing inks thereto even after storage in a high-temperature high-humidity atmosphere.

DETAILED DESCRIPTION OF THE PREFERRED EMBODIMENTS

The processes for surface treatment of the present invention comprise subjecting a surface of a thermoplastic resin film (i) to a first oxidation treatment, coating the oxidized surface with a surface modifier, subsequently stretching the film, subjecting that surface of the thermoplastic resin film (i) which has been coated with the surface modifier to a second oxidation treatment, and then coating the oxidized surface with a surface modifier. The processes will be explained below in detail.

(1) Thermoplastic Resin Film (i)

Non-limiting examples of the thermoplastic resin for use in the thermoplastic resin film (i) to be treated in the present invention include ethylene resins such as high-density polyethylene and medium-density polyethylene, polyolefin resins such as propylene resins, poly(methyl-1-pentene), ethylene/cycloolefin copolymers, polyamide resins such as nylon-6, nylon-6,6, nylon-6,10, nylon-6,12, and nylon-6,T, thermoplastic polyester resins such as poly(ethylene terephthalate) and copolymers thereof, poly(ethylene naphthalate), and aliphatic polyesters, and other thermoplastic resins such as polycarbonates, atactic polystyrene, syndiotactic polystyrene, and poly(phenylene sulfide). A mixture of two or more of these polymers may be used.

Among the thermoplastic resins enumerated above, the nonpolar polyolefin resins are preferably used for enhancing the effects of the present invention. Preferred of the polyolefin resins from the standpoints of chemical resistance, cost, etc. are propylene resins.

Usable examples of the propylene resins include polypropylenes which are propylene homopolymers including the isotactic and syndiotactic ones and those having various degrees of stereoregularity. Examples thereof further include copolymers of propylene as the main monomer with one or more a-olefins such as ethylene, butene-1, hexene-1, heptene-1, and 4-methylpentene-1. These copolymers may be bi-, ter-, or tetrapolymers, and may be random or block copolymers.

In the case of using a propylene homopolymer, a resin having a lower melting point than the propylene homopolymer is preferably incorporated thereinto in an amount of from 2 to 25 wt % for the purpose of improving stretchability. Examples of such a resin include polyethylene and ethylene/vinyl acetate copolymers.

The thermoplastic resin film (i) is not particularly limited in structure. For example, it may have a single-layer structure, a two-layer structure composed of a base layer (ii) and a surface layer (iii), a three-layer structure composed of a base layer (ii) and two surface layers (iii) disposed respectively on the front and back sides thereof, or a multilayer structure comprising a base layer (ii), a surface layer (iii), and one or more other resin film layers interposed therebetween. The thermoplastic resin film (i) may contain fine inorganic particles or an organic filler, or may contain no such particulate ingredient.

In the case where the thermoplastic resin film (i) is a single-layer polyolefin resin film containing fine inorganic particles, the film generally comprises from 40 to 99.5 wt % polyolefin resin and from 60 to 0.5 wt % fine inorganic particles and this base layer (ii) preferably comprises from 50 to 97 wt % polyolefin resin and from 50 to 3 wt % fine inorganic particles. When the thermoplastic resin film (i) has a multilayer structure comprising a base layer (ii) and a surface layer (iii) each containing fine inorganic particles, then the base layer (ii) generally comprises from 40 to 99.5 wt % polyolefin resin and from 60 to 0.5 wt % fine inorganic particles and the surface layer (iii) generally comprises from 25 to 100 wt % polyolefin resin and from 75 to 0 wt % fine inorganic particles. In the above case, the base layer (ii) preferably comprises from 50 to 97 wt % polyolefin resin and from 50 to 3 wt % fine inorganic particles and the surface layer (iii) preferably comprises from 30 to 97 wt % polyolefin resin and from 70 to 3 wt % fine inorganic particles.

If the amount of fine inorganic particles contained in the base layer (ii) of the single-layer or multilayered film exceeds 60 wt %, the resin film is apt to break during transverse-direction stretching conducted after machine-direction stretching. If the amount of fine inorganic particles contained in the surface layer (iii) exceeds 75 wt %, the surface layer after transverse-direction stretching has too low a surface strength and suffers breakage during application of a printing ink thereto.

Non-limiting examples of the fine inorganic particles include particles of calcium carbonate, calcined clay, silica, diatomaceous earth, talc, titanium oxide, barium sulfate, alumina, and the like. Such particulate materials each has an average particle diameter of from 0.01 to 15 $\mu$m.

In the case where the thermoplastic resin film is a polyolefin resin film, an organic filler having a higher melting point (e.g., from 170 to 300° C.) or a higher glass transition temperature (e.g., from 170 to 280° C.) than the polyolefin resin is used. Examples of such filler material include poly(ethylene terephthalate), poly(butylene terephthalate), polycarbonates, nylon-6, nylon-6,6, nylon-6,T, and cycloolefin polymers.

If desired and necessary, a stabilizer, light stabilizer, dispersant, lubricant, and other additives may be incorporated. Specifically, a stabilizer such as, e.g., a sterically hindered phenol, a phosphorus compound, or an amine may be added in an amount of from 0.001 to 1 wt %. A light stabilizer such as, e.g., a sterically hindered amine or a benzotriazole or benzophenone compound may be added in an amount of from 0.001 to 1 wt %. Furthermore, a dispersant for fine inorganic particles, such as a silane coupling agent, a higher fatty acid, e.g., oleic acid or stearic acid, a metal soap, poly(acrylic acid), poly(methacrylic acid), a salt of either, or the like, may be added in an amount of from 0.01 to 4 wt %.

Formation of Resin Film

Methods for forming a thermoplastic resin film are not particularly limited, and various known techniques can be used. Examples thereof include casting in which one or more molten resins are extruded into sheet form with a single-layer or multilayered T- or I-die connected to one or more screw extruders, calendering, rolling, and inflation. Examples thereof further include: a method which comprises forming a mixture of a thermoplastic resin and an organic solvent or oil into a film by casting or calendering and then removing the solvent or oil from the film; and a method which comprises forming a solution of a thermoplastic resin into a film and removing the solvent therefrom.

For stretching, various known techniques can be used. Examples thereof include machine-direction stretching by means of rolls having different peripheral speeds and transverse-direction stretching with a tenter oven.

Resin Film

The thermoplastic resin film to be treated in the present invention, which comprises a thermoplastic resin, may be a stretched film or an unstretched film. However, the film should be one which can be stretched after a first surface treatment. It may contain fine inorganic particles or an organic filler, or may contain no such particulate ingredient. Furthermore, the thermoplastic resin film may comprise a stretched base layer and an unstretched resin layer disposed on at least one side thereof In the case where the thermoplastic resin film (i) is a single-layer polyolefin resin film containing fine inorganic particles, this film can be obtained in the following manner. A film of a resin composition comprising from 40 to 99.5 wt % polyolefin resin and from 60 to 0.5 wt % fine inorganic particles is stretched uni- or biaxially at a temperature lower than the melting point of the polyolefin resin preferably by 3 to 60° C., whereby a microporous stretched us resin film having fine cracks on its surfaces and further having microvoids inside can be obtained.

A multilayered film for use as the thermoplastic resin film (i) can be obtained in the following manner. A film of a resin composition comprising from 40 to 100 wt % polyolefin resin and from 60 to 0 wt % fine inorganic particles is stretched in the machine direction at a temperature lower than the melting point of the polyolefin resin preferably by 3 to 60° C. to form a base layer (ii). Subsequently, a film of a resin composition comprising from 25 to 100 wt % polyolefin resin and from 75 to 0 wt % fine inorganic particles is laminated as a surface layer (iii) to at least one side of the base layer (ii). Thus, a multilayered film capable of being subjected to a first surface treatment is obtained.

More preferred examples of the films described above include: a film obtained by uniaxially stretching a polyolefin resin film containing from 5 to 60 wt % fine particles of calcined clay, heavy or lightweight calcium carbonate, titanium oxide, talc, or the like to form on the surfaces thereof numerous cracks extending from these fine inorganic particles and to thus make the film translucent or opaque; a film obtained by laminating a layer of a resin composition containing fine particles such as those shown above to the above-described translucent or opaque film; and a sheet which is an untreated sheet to be stretched or has undergone machine-direction stretching in successive biaxial stretching operations and which is a laminate for use in synthetic paper production having, as a surface layer, a polyolefin resin film layer containing substantially no fine inorganic particles, such as those described, e.g., in JP-B-1-6041 1 and JP-A-61-3748.

The thickness of the resin film to be subjected to the first surface treatment in the present invention can be selected according to the stretch ratio and the film thickness necessary after stretching. The thickness thereof is generally from 20 to 4,000 $\mu$m, preferably from 100 to 3,000 $\mu$m.

First Surface Oxidation Treatment

The first surface oxidation treatment of the film is at least one treatment selected from corona discharge treatment, flame treatment, plasma treatment, glow discharge treatment, and ozone treatment, and is preferably corona discharge treatment or flame treatment. In the case of corona discharge treatment, the amount of the treatment is generally at least 600 J/m$^2$, more generally from 600 to 12,000 J/m$^2$ (10 to 200 W×min/m$^2$), preferably from 1,200 to 9,000 J/m$^2$ (20 to 180 W×min/m$^2$).

If the amount of corona discharge treatment is below 600 J/m$^2$ (10 W×min/m$^2$), the effect of corona discharge treatment is insufficient and the subsequent application of a surface modifier results in cissing. Even if the amount thereof exceeds 12,000 J/m$^2$ (200 W×min/m$^2$), the effect of the treatment cannot be heightened any more. Consequently, corona discharge treatment amounts up to 12,000 J/m$^2$ (180 W×min/m$^2$) are sufficient.

In the case of flame treatment, the amount of the treatment is generally at least 8,000 J/m$^2$, more generally from 8,000 to 200,000 J/m$^2$, preferably from 20,000 to 100,000 J/m$^2$. If the amount of flame treatment is below 8,000 J/m$^2$, the effect of flame treatment is insufficient and the subsequent application of a surface modifier results in cissing. Even if the amount thereof exceeds 200,000 J/m$^2$, the effect of the treatment cannot be heightened any more. Consequently, flame treatment amounts up to 200,000 J/m$^2$ are sufficient.

First Surface Modifier

The first surface modifier consists mainly of one or more members selected from the following primers and antistatic polymers. From the standpoint of improving printability, primers are preferred as the first surface modifier. In the case where antistatic properties are to be imparted, a combination of at least one primer and at least one antistatic polymer is preferred as the first surface modifier.

(1) Primer

Usable primers include polyethyleneimine polymers such as polyethyleneimine, alkyl-modified polyethyleneimines in which the alkyl has 1 to 12 carbon atoms, poly(ethyleneimineurea), ethyleneimine adducts of polyaminepolyamides, and epichlorohydrin adducts of polyaminepolyamides, acrylic ester polymers such as acrylamide/acrylic ester copolymers, acrylamide/acrylic ester/methacrylic ester copolymers, polyacrylamide derivatives, acrylic ester polymers containing oxazoline groups, and poly(acrylic ester)s, water-soluble resins such as polyvinylpyrrolidone, polyethylene glycol, and poly(vinyl alcohol) resins, and water-dispersible resins such as poly(vinyl acetate), polyurethanes, ethylene/vinyl acetate copolymers, poly(vinylidene chloride), chlorinated polypropylene, and acrylonitrile/butadiene copolymers.

Preferred of these are polyethyleneimine polymers, urethane resins, poly(acrylic ester)s, and the like. More preferred are polyethyleneimine polymers. Most preferred are polyethyleneimine having a degree of polymerization of from 20 to 3,000, ethyleneimine adducts of polyaminepolyamides, and modified polyethyleneimines obtained by modifying these polyethyleneimine polymers with one or more haloalkyl, haloalkenyl, halocycloalkyl, or halobenzyl groups each having 1 to 24 carbon atoms.

(2) Crosslinking Agent

The film strength and water resistance of the primers described above can be improved further by adding a crosslinking agent. Examples of the crosslinking agent include epoxy resins such as glycidyl ethers and glycidyl esters and water-dispersible resins such as isocyanate, oxazoline, formalin, and hydrazide resins.

The amount of the crosslinking agent is generally from 1 to 500 parts by weight per 100 parts by weight of the primer.

(3) Antistatic Polymer

Examples of the antistatic polymer include water-soluble nitrogen-containing acrylic polymers and styrene/maleic anhydride copolymers. Especially preferred are nitrogen-containing acrylic polymers.

(A) Nitrogen-containing Acrylic Polymer

The water-soluble nitrogen-containing polymers which impart antistatic properties may be acrylic polymers containing tertiary or quaternary nitrogen atoms. Specific examples thereof include polymers containing units derived from at least one of the monomers represented by the following chemical formulae (i) to (iv).

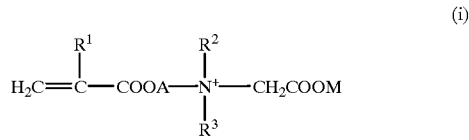

(i)

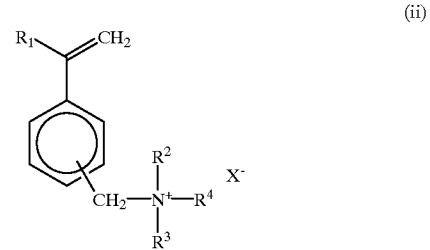

(ii)

(In formula (ii), the —CH$_2$N$^+$R$^2$R$^3$R$^4$) group is bonded to the aromatic ring in any of the ortho, meta, and para positions to the —CR═CH$_2$ group, but is preferably bonded in the para position.)

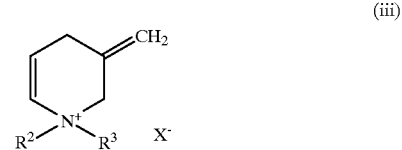

(iii)

-continued

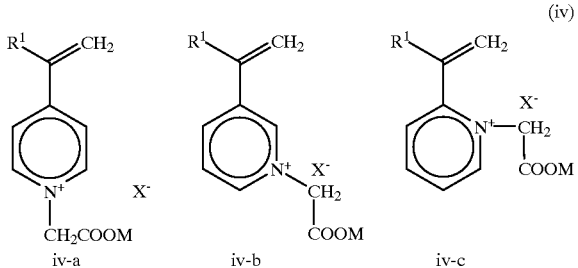

Formula (iv) is at least one member selected from formulae (iv-a), (iv-b), and (iv-c), and is preferably (iv-a).

In chemical formulae (i) to (iv) shown above, $R^1$ represents a hydrogen atom or a methyl group; $R^2$ and $R^3$ each represents a lower alkyl group (having preferably 1 to 4, more preferably 1 or 2 carbon atoms); $R^4$ represents a saturated or unsaturated alkyl group having 1 to 22 carbon atoms or a cycloalkyl group; $X^-$ represents a counter anion (e.g., a halide (especially chloride)) for the quaternized $N^+$; M represents an alkali metal ion (especially sodium, potassium, or lithium); and A represents an alkylene group having 2 to 6 carbon atoms.

It is a matter of course that a polymer of any of monomers containing a quaternary nitrogen atom which are represented by chemical formulae (i), (ii), (iii), and (iv) can be obtained by polymerizing the corresponding precursor monomer containing a tertiary nitrogen atom and then quaternizing the nitrogen atoms of the resulting polymer with a cationizing agent such as an alkyl halide, dimethyl sulfate, or a monochloroacetic ester.

Although the antistatic agent in the present invention should be water-soluble, it is undesirable that the antistatic agent be excessively water-soluble. Consequently, the polymer containing quaternary nitrogen atoms for use as component (A) is desirably a copolymer of any of the above-described monomers with one or more hydrophobic monomers. Examples of the hydrophobic monomers include styrene in which the aromatic ring or side chain may be substituted, acrylic or methacrylic esters, and vinyl halides.

Preferred Antistatic Polymers

Especially preferred antistatic polymers for use as component (A) in the present invention are copolymers of the following ingredients (a) to (c).

Ingredient (a): from 20 to 40 wt % monomer which contains a quaternary nitrogen atom and is represented by one of chemical formulae (i) to (iv).

Ingredient (b): from 6 to 80 wt % monomer represented by the general formula

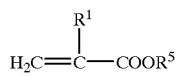

(wherein $R^1$ represents a hydrogen atom or a methyl group, and $R^5$ represents an alkyl group having 1 to 22 carbon atoms, an aralkyl group having 7 to 22 carbon atoms, or a cycloalkyl group having 5 to 22 carbon atoms).

Ingredient (c): from 0 to 20 wt % one or more other hydrophobic vinyl monomers.

Most Preferred Antistatic Polymers

The most preferred antistatic polymers for use as component (A) in the present invention are copolymers of the monomers (a) to (c) in which the monomer containing a quaternary nitrogen atom as ingredient (a) is represented by chemical formula (i) wherein ) is $Cl^-$.

Also preferred for use as component (A) is the quaternary ammonium salt copolymer described in JP-A-6-25447, which is obtained by copolymerizing (a') from 30 to 70 wt % monomer represented by the general formula

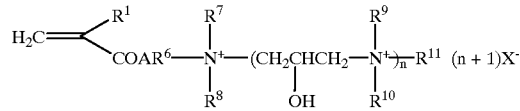

(wherein A represents —O— or —NH—; $R^1$ represents a hydrogen atom or a methyl group; $R^6$ represents an alkylene group having 2 to 4 carbon atoms or —$CH_2$—$CH(OH)$—$CH_2$—, $R^7, R^8, R^9$, and $R^{10}$ may be the same or different and each represents an alkyl group having 1 to 3 carbon atoms; $R^{11}$ represents an alkyl group having 1 to 10 carbon atoms or an aralkyl group having 7 to 10 carbon atoms; n represents an integer of 1 to 3; and X represents a chlorine, bromine, or iodine atom), (b) from 30 to 70 wt % monomer represented by the general formula

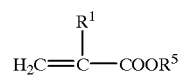

(wherein $R^1$ represents a hydrogen atom or a methyl group, and $R^5$ represents an alkyl group having 1 to 22 carbon atoms, an aralkyl group having 7 to 22 carbon atoms, or a cycloalkyl group having 5 to 22 carbon atoms); and (c) from 0 to 40 wt % one or more other hydrophobic vinyl monomers.

Specific examples of the monomer (a') described above can be obtained by modifying monomers containing a tertiary amine which are represented by the following general formula (IV), such as, e.g., dimethylaminoethyl acrylate, diethylaminoethyl acrylate, the corresponding methacrylates, dimethylaminopropylacrylamide, and the corresponding methacrylamide, with a modifying agent represented by the following general formula (VI) such as, e.g., 3-chloro-2-hydroxypropyltrimethylammonium chloride. Modification with the modifying agent may be conducted either before or after polymerization.

(IV)

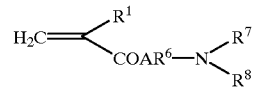

(In formula (IV), A represents —O— or —NH—, $R^1$ represents a hydrogen atom or a methyl group; $R^6$ represents an alkylene group having 2 to 4 carbon atoms or —$CH_2$—$CH(OH)$—$CH_2$—; and $R^7$ and $R^8$ may be the same or different and each represents an alkyl group having 1 to 3 carbon atoms.)

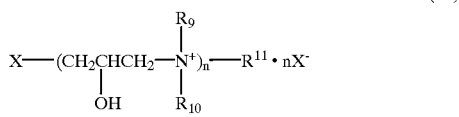

(In formula (VI), $R^9$ and $R^{10}$ may be the same or different and each represents an alkyl group having 1 to 3 carbon atoms; $R^{11}$ represents an alkyl group having 1 to 10 carbon atoms or an aralkyl group having 7 to 10 carbon atoms; n represents an integer of 1 to 3; and X represents a chlorine, bromine, or iodine atom.)

Examples of the hydrophobic monomer as ingredient (b) include alkyl (meth)acrylates such as methyl (meth)acrylate, ethyl (meth)acrylate, butyl (meth)acrylate, isobutyl (meth) acrylate, t-butyl (meth)acrylate, cyclohexyl (meth)acrylate, 2-ethylhexyl (meth)acrylate, lauryl (meth)acrylate, tridecyl (meth)acrylate, and stearyl (meth)acrylate.

Examples of the monomers as ingredient (c), which are optionally used monomers copolymerizable with ingredient (a) or (a') and with ingredient (b), include hydrophobic monomers such as styrene, vinyltoluene, and vinyl acetate and hydrophilic monomers such as vinylpyrrolidone and (meth)acrylamide.

For obtaining a copolymer for use as the water-soluble antistatic agent as component (A), polymerization can be conducted in the presence of a radical initiator by a known polymerization method such as, e.g., bulk polymerization, solution polymerization, or emulsion polymerization. Preferred of these polymerization techniques is solution polymerization, in which the monomers are dissolved in a solvent and heated with stirring in a nitrogen stream in the presence of a radical polymerization initiator. Preferred solvents include water and alcohols such as methyl alcohol, ethyl alcohol, and isopropyl alcohol. A mixture of two or more of such solvents may be used to conduct the polymerization. Suitable polymerization initiators include peroxides such as benzoyl peroxide and lauroyl peroxide and azo compounds such as azobisisobutyronitrile and azobisvaleronitrile. The monomer concentration in the solution is generally from 10 to 60 wt %, and the concentration of the polymerization initiator is generally from 0.1 to 10 wt % based on the monomers.

The quaternary ammonium salt copolymer can be regulated so as to have any desired level of molecular weight by controlling the polymerization conditions including polymerization temperature, the kind and amount of a polymerization initiator, solvent amount, and a chain transfer agent. The polymer obtained has an average molecular weight (Mn) of generally from 1,000 to 1,000,000, preferably from 1,000 to 500,000.

The amount of the antistatic polymer is generally from 10 to 500 parts by weight, preferably from 30 to 250 parts by weight, per 100 parts by weight of the primer. If the amount of the antistatic polymer is smaller than 10 parts by weight, the surface modifier shows an insufficient antistatic effect. If the amount thereof exceeds 500 parts by weight, there are cases where the treated film has insufficient printing ink adhesion thereto.

If desired and necessary, the first surface modifier for use in the present invention may contain optional ingredients. The amount of such optional ingredients is generally up to 50 parts by weight per 100 parts by weight of the primer.

(4) Optional Ingredient 1: Alkali Metal Salts or Alkaline Earth Metal Salts

Examples of the alkali metal salts or alkaline earth metal salts include water-soluble inorganic alkaline salts such as sodium carbonate, sodium hydrogen carbonate, potassium carbonate, and sodium sulfite and other water-soluble inorganic salts such as sodium chloride, sodium sulfate, sodium nitrate, sodium tripolyphosphate, sodium pyrophosphate, and ammonium alum.

(5) Optional Ingredient 2: The Surface Modifier Can Further Contain Surfactants, Antifoamers, Water-Soluble or Water-Dispersible, Finely Divided Substances, and Other Auxiliary Agents.

Formation of First Surface Modification Layer

The above-described ingredients for a surface modification layer are used in the form of a solution in water or a hydrophilic solvent such as methyl alcohol, ethyl alcohol, or isopropyl alcohol, and usually in the form of an aqueous solution. The solution has a concentration of generally about from 0.1 to 20 wt %, preferably about from 0.1 to 10 wt %.

For applying the coating solution, a coater is used such as, e.g., a roll coater, blade coater, bar coater, air knife coater, size pressure coater, gravure coater, reverse roll coater, die coater, lip coater, or spray coater. Smoothing is conducted if necessary. The coating solution applied is dried to remove the water or hydrophilic solvent.

The coating solution is applied in an amount of generally from 0.005 to 5 g/m$^2$, preferably from 0.01 to 2 g/m$^2$, on a solid basis.

Stretching

Stretching can be conducted by various known techniques in a known temperature range suitable for the thermoplastic resin which is being treated. For example, in the case where a noncrystalline thermoplastic resin is used, the film can be stretched at a temperature not lower than the glass transition point of the resin. In the case of using a crystalline thermoplastic resin, the film can be stretched at a temperature not lower than the glass transition point of the noncrystalline parts of the resin but not higher than the melting point of the crystalline parts thereof Examples of the stretching techniques include machine-direction stretching with rolls having different peripheral speeds, transverse-direction stretching with a tenter oven, rolling, and simultaneous biaxial stretching with a combination of a tenter oven and a linear motor.

Stretch ratio is not particularly limited, and a suitable stretch ratio is selected according to the purpose and the properties of the thermoplastic resin used. For example, in the case where polypropylene or a propylene copolymer is used as the thermoplastic resin, the stretch ratio in uniaxial stretching is generally about from 1.2 to 12, preferably from 2 to 10, and that in biaxial stretching is generally from 1.5 to 60, preferably from 10 to 50, in terms of areal stretch ratio. In the case of using other thermoplastic resins, the stretch ratio in uniaxial stretching is generally from 1.2 to 10, preferably from 2 to 5, and that in biaxial stretching is generally from 1.5 to 20, preferably from 4 to 12, in terms of areal stretch ratio. If desired and necessary, the stretched film is heat-treated at a high temperature.

The stretching is conducted at a temperature lower by from 2 to 60° C. than the melting point of the thermoplastic resin used. For example, a film in which the resin is a propylene homopolymer (melting point, 155–167° C.) is stretched at 152 to 164° C., while a film in which the resin is high-density polyethylene (melting point, 121–134° C.) is stretched at 110 to 120° C. Furthermore, a film in which the resin is poly(ethylene terephthalate) (melting point, 246–252° C.) is stretched at 104 to 115° C. The stretching rate may be from 20 to 350 m/min.

In the case where the thermoplastic resin film contains fine inorganic particles or an organic filler, fine cracks generate on the film surfaces and microvoids generate inside the film.

The thickness of the thermoplastic resin film (i) after stretching is generally from 20 to 350 μm, preferably from 35 to 300 μm.

(Properties of the Stretched Film)

This stretched thermoplastic resin film, serving as a base, has a void content as defined by the following equation of from 10 to 60%, a density of from 0.650 to 1.20 g/cm³, an opacity of 60% or higher, and a Bekk's surface smoothness of from 50 to 25,000 seconds.

$$\text{Void content (\%)} = \frac{\rho_0 - \rho}{\rho_0} \times 100$$

$\rho_0$: density of the unstretched resin film
$\rho$: density of the stretched resin film Second Surface Oxidation Treatment The second surface oxidation treatment of the base is a treatment selected from corona discharge treatment, flame treatment, plasma treatment, glow discharge treatment, and ozone treatment. Of these, corona discharge treatment and flame treatment are preferred, and corona discharge treatment is more preferred.

In the case of corona discharge treatment, the amount of the treatment is generally at least 600 J/m², more generally from 600 to 12,000 J/m² (10 to 200 W×min/m²), preferably from 1,200 to 9,000 J/m² (20 to 180 W×min/m²). If the amount of corona discharge treatment is below 600 J/m² (10 W×min/m²), the effect of corona discharge treatment is insufficient and the subsequent application of a surface modifier results in cissing. Even if the amount thereof exceeds 12,000 J/m² (200 W×min/m²), the effect of the treatment cannot be (180 W×min/m²) are sufficient. In the case of flame treatment, the amount of the treatment is generally at least 8,000 J/m², more generally from 8,000 to 200,000 J/m², preferably from 20,000 to 100,000 J/m². If the amount of flame treatment is below 8,000 J/m², the effect of flame treatment is insufficient and the subsequent application of a surface modifier results in cissing. Even if the amount thereof exceeds 200,000 J/m², the effect of the treatment cannot be heightened any more. Consequently, flame treatment amounts up to 200,000 J/m² are sufficient.

Second Surface Modifier

The second surface modifier can comprise one or more members selected from the same antistatic polymers and primers enumerated hereinabove as examples of the first surface modifier. More preferred is a combination of at least one antistatic polymer and at least one primer.

Formation of Second Surface Modification Layer

The above ingredients for a second surface modification layer are used in the form of a solution in water or a hydrophilic solvent such as methyl alcohol, ethyl alcohol, or isopropyl alcohol, and usually in the form of an aqueous solution. The solution has a solid content of generally from 0.1 to 20 wt %, preferably from 0.1 to 10 wt %. For applying the coating solution, a coater is used such as, e.g., a roll coater, blade coater, bar coater, air knife coater, size pressure coater, gravure coater, reverse roll coater, die coater, lip coater, or spray coater. Smoothing is conducted if necessary. The coating solution applied is dried to remove the water or hydrophilic solvent.

The coating solution is applied in an amount of generally from 0.005 to 10 g/m², preferably from 0.01 to 5 g/m², on a solid basis.

Printing

The thus-obtained thermoplastic resin film (i) for printing, which comprises the thermoplastic resin film (i) and a primer layer formed thereon, can be subjected to offset printing with ultraviolet-curing inks, not to mention letterpress printing, gravure printing, flexography, and offset printing with solvent-based inks.

The present invention will be explained below in more detail by reference to the following Examples. In these Examples, the following materials were used and properties were evaluated by the methods which will be described later. Each "part" or "parts" indicating an ingredient amount is by weight.

Surface Modifiers (1) Preparation of First Surface Modifiers (G1 to G3)
Synthesis of Modified Ethyleneimine Polymer
Alkyl-modified Ethyleneimine Polymer (F1)

Into a four-necked flask equipped with a stirrer, reflux condenser, thermometer, and nitrogen gas feed pipe were introduced 100 parts of a 25 wt % aqueous solution of polyethyleneimine "Epomine P-1000" (trade name; degree of polymerization, 1,600), manufactured by Nippon Shokubai Kagaku Kogyo Co., Ltd., 15 parts of n-butyl chloride, and 10 parts of isopropyl alcohol. The contents were stirred under a nitrogen atmosphere at 80° C. to conduct a modification reaction for 25 hours, whereby an aqueous solution of a butyl-modified polyethyleneimine was obtained. Water was added to the solution to adjust the concentration of the butyl-modified polyethyleneimine to 25 wt %. (This solution is hereinafter referred to as F1.)

(G1)

To 100 parts of water was added 11 parts of aqueous solution (F1). This mixture was homogenized by stirring to prepare surface modifier (G1) for a first coating operation.

(G2)

To 100 parts of water was added 6 parts of "Polymine SN" (trade name for an aqueous solution containing a polyethyleneimine polymer as the main component; manufactured by BASF AG; solid content 24 wt %; hereinafter referred to as F2). This mixture was homogenized by stirring to prepare surface modifier (G2) for a first coating operation.

(G3)

Into a four-necked flask equipped with a reflux condenser, thermometer, glass tube for nitrogen displacement, and stirrer were introduced 35 parts of dimethylaminoethyl methacrylate, 20 parts of ethyl methacrylate, 20 parts of cyclohexyl methacrylate, 25 parts of stearyl methacrylate, 150 parts of ethyl alcohol, and 1 part of azobisisobutyronitrile. Polymerization was conducted at 80° C. for 6 hours under a nitrogen atmosphere.

To the reaction mixture was added 70 parts of a 60% solution of 3-chloro-2-hydroxypropylammonium chloride. The resultant mixture was reacted at 80° C. for 15 hours.

Thereafter, the ethyl alcohol was distilled off while dropwise adding water. Thus, a solution having a final solid content of 30% was obtained which contained a quaternary ammonium salt copolymer (referred to as H1) as the solid. This copolymer was an alkyl acrylate polymer containing groups represented by the following general formula in the molecular chain.

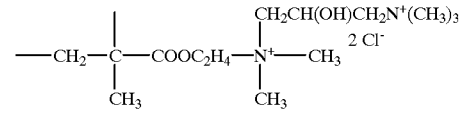

To 100 parts of water were added 6 parts of aqueous solution (F1) and 3 parts of quaternary ammonium salt copolymer (H1). This mixture was homogenized by stirring to prepare surface modifier (G3) for a first coating operation.

(2) Preparation of Second Surface Modifiers (J1 to J4)

(J1)

To 100 parts of water were added 0.7 parts of aqueous solution (Fl), which is the aqueous solution of a butyl-modified polyethyleneimine shown above under "First Surface Modifiers", 0.5 parts of antistatic agent (HI), 0.5 parts of "WS-570" (trade name for an aqueous solution containing as the main component an ethyleneimine adduct of a polyamine-polyamide; manufactured by Nippon PMC Co., Ltd.; solid content, 12.5 wt %; referred to as F3), and 0.1 part of sodium carbonate. This mixture was homogenized by stirring to prepare second surface modifier (J1).

(J2)

To 100 parts of water were added 0.5 parts of "Polymine SN (F2)", 1.2 parts of "Saftomer ST-1100B" (trade name for an aqueous antistatic agent solution containing an acrylic ester polymer having quaternary nitrogen atoms as the main component; manufactured by Mitsubishi Chemical Co., Ltd.; solid content, 10 wt %; referred to as H2), 0.5 parts of ethyleneimine/polyamine-polyamide adduct (F3), and 0.1 part of sodium carbonate. This mixture was homogenized by stirring to prepare second surface modifier (J2).

"ST-1100B", used above, is an alkyl methacrylate polymer containing groups represented by the following general formula in the molecule:

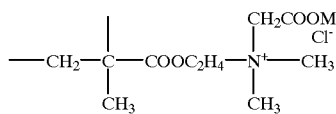

(wherein COOM represents an alkali metal salt of the carboxylic acid).

(J3)

To 100 parts of water were added 3 parts of maleic acid salt polymer antistatic agent "Saftomer ST-6000" (trade name; manufactured by Mitsubishi Chemical Co., Ltd., solid content, 34 wt %; referred to as H3), 2 parts of polyurethane resin primer "HUX-401 " (trade name; manufactured by Asahi Denka Kogyo K.K.; solid content, 40 wt %; referred to as F4), and 2 parts of "WS-500" (trade name for an acrylic resin containing oxazoline groups, manufactured by Nippon Shokubai Kagaku Kogyo Co., Ltd.; solid content, 40 wt %; referred to as F5). This mixture was homogenized by stirring to prepare second surface modifier (J3).

(J4)

To 100 parts of water were added 3 parts of "Saftomer ST-6000" (H3) and 2 parts of "Acronal YJ-2715D" (trade name for an alkyl acrylate polymer dispersion; manufactured by Mitsubishi Chemical BASF Co., Ltd.; solid content, about 50 wt %; referred to as F6). This mixture was homogenized by stirring to prepare second surface modifier (J4).

EXAMPLE 1

(1) Resin Sheet

Production Example 1 (P1)

Composition (C') containing a mixture of polypropylene having a melt flow rate (MFR) of 0.8 g/10 min and 15 wt % heavy calcium carbonate having an average particle diameter of 1.5 $\mu$m was kneaded with an extruder set at 240° C., extruded into a sheet, and then cooled with a cooler to obtain an unstretched sheet.

The above composition extruded into a sheet and the compositions used below for extrusion or laminating each contained 0.05 parts of 3-methyl-2,6-di-t-butylphenol, 0.05 parts of "Irganox 1010" (trade name; manufactured by Ciba-Geigy Ltd.) as a phenolic stabilizer, and 0.05 parts of "Weston 618" (trade name; manufactured by Borg Warner K.K.) as a phosphorus compound stabilizer per 100 parts of the sum of the polypropylene and calcium carbonate used.

The sheet obtained above was heated to 140° C. and stretched 5 times in the machine direction.

Composition (A') containing a mixture of 50 wt % polypropylene having an MFR of 4.0 g/10 min, 5 wt % polypropylene modified with maleic acid, and 45 wt % calcium carbonate having an average particle diameter of 1.5 $\mu$m was melt-kneaded with an extruder set at 250° C. On the other hand, composition (B') containing a mixture of 55 wt % polypropylene having an MFR of 4.0 g/10 min and 45 wt % calcium carbonate having an average particle diameter of 1.5 $\mu$m was melt-kneaded with another extruder set at 250° C. The melt of composition (A') and that of composition (B') were laminated to each other within a die and co-extruded on both sides of the 5-fold lengthwise stretched sheet obtained above in such a manner that each layer of composition (A') faced outward. Thus, a five-layer laminate (A'/B'/C'/B'/A') was obtained (2) First Oxidation Treatment The five-layer laminate (P1) was subjected on its front side to the following corona discharge treatment.

Corona discharge treatment apparatus "HFS400F", manufactured by Kasuga Denki Co., Ltd., having an aluminum electrode and a silicone-covered roll as a treater roll was used to treat the laminate under the conditions of an electrode/roll gap of 2 mm, a line treating velocity of about 30 m/min, and an applied energy density of 100 W×min/m².

(3) Coating with First Surface Modifier

The laminate surface which had undergone the above corona discharge treatment was coated with surface modifier (G1), shown hereinabove under "Preparation of Surface Modifiers", in an amount of about 9 g/m² on a wet basis (corresponding to about 0.23 g/m² on a dry basis). The coated laminate was introduced into the tenter oven shown below.

(4) Stretching

In the tenter oven, the five-layer laminate which had undergone the above oxidation treatment and coating was heated at 155° C. and then stretched 8.5 times in the transverse direction to obtain a five-layer laminated film having a thickness of 130 $\mu$m (thicknesses of the layers: 8 $\mu$m /25 $\mu$m/64 $\mu$m/25 $\mu$m/8 $\mu$m).

(5) Second Oxidation Treatment

The five-layer laminated film which had undergone the above stretching was subjected again to corona discharge treatment in the following manner. Both sides of the film was treated with corona discharge treatment apparatus "HFS400F", manufactured by Kasuga Denki Co., Ltd., having an aluminum electrode and a silicone-covered roll as a treater roll under the conditions of an electrode/roll gap of 1.3 mm, a line treating velocity of about 30 m/min, and an applied energy density of 100 W×min/m².

(6) Coating with Second Surface Modifier

The film was then coated with surface modifier (J I), shown hereinabove under "Preparation of Second Surface Modifiers", by means of a roll coater in an amount of 0.06 g/m² on a dry basis, and then dried at about 65° C. for several tens of seconds. This coated film was wound up to obtain a surface-modified synthetic paper. This synthetic paper was evaluated for ink adhesion, moisture resistance, water resistance, antistatic properties, etc. by the methods shown below.

[III] Evaluation

The adhesion of UV-curing offset ink and antistatic properties were evaluated by the following test methods.

(I) Determination of Ink Adhesion

The synthetic paper obtained was coated with an ultraviolet-curing ink ("Bestcure 161" (black), manufactured by Toka Shikiso Chemical Industry Co., Ltd.) by means of "RI Tester" (manufactured by Akira Seisakusho) in an amount of 1.5 g/m². The printed paper was passed once at a speed of 10 m/min under a metal halide lamp (80 W/cm) manufactured by Eye Graphic Co., Ltd. placed 10 cm above to irradiate and dry the ink. A piece of "Cellotape" (pressure-sensitive adhesive tape manufactured by Nichiban Co., Ltd.) was intimately applied onto the ink surface and then quickly peeled off. The ink adhesion was evaluated in the following five grades.

5: The ink layer did not peel off at all (no problem in practical use).

4: A small portion of the ink layer peeled off(no problem in practical use).

3: The peeled area of the ink layer was not more than 25% (no problem in practical use).

2: The peeled area of the ink layer was about between 25 and 50% (slightly unsuitable for practical use).

1: The peeled area of the ink layer was 50% or more (unsuitable for practical use).

The ink adhesion in Example 1 was rated as 5. The results obtained are shown in Table 1.

(2) Evaluation of Moisture Resistance: Transferability of UV Ink after Storage in High-Temperature High-Humidity Atmosphere The synthetic paper obtained was stored in an atmosphere having a temperature of 40° C. and a relative humidity of 80%, and then coated with an ultraviolet-curing ink ("L-Carton" (black), manufactured by Toka Shikiso Chemical Industry Co., Ltd.) by means of "RI Tester" (manufactured by Akira Seisakusho) in an amount of 1.5 g/m². The ink applied was irradiated and dried using the metal halide lamp in the same manner as the above. Thereafter, the optical reflection density (Macbeth density) was measured with a Macbeth densitometer (manufactured by Colmogen Inc., U.S.A.). Furthermore, the printed surface was visually examined for ink transfer failures such as coating streaks or blind spots. The ink transferability was evaluated in the following, five grades.

5: Excellent.

4: Good.

3: Acceptable to practical use although the color of the transferred ink is thin.

2: The transferred ink has a thin color and coating streaks (unsuitable for practical use).

1: The ink was scarcely transferred (unsuitable for practical use).

The ink transferability in Example 1 was rated as 5. The results obtained are shown in Table 1.

(3) Water Resistance: Ink Adhesion after Immersion in Water

The printed synthetic paper obtained in (1) above was immersed in water for 3 days and then evaluated for ink adhesion by the same method as in (1). The same evaluation method as in (1) was used.

The water resistance in Example 1 was rated as 5. The results obtained are shown in Table 1.

(4) Surface Resistivity

The surface resistivity of the synthetic paper obtained was measured with "DSM-8103" (trade name), manufactured by Toa Electronics Ltd., under the conditions of a temperature of 23° C. and a relative humidity of 50%. A synthetic paper having a surface resistivity of 10E+12 Ω/□ or lower is judged to have satisfactory suitability for paper feeding and discharge in printing.

The surface resistivity of the synthetic paper obtained in Example 1 was 2.5E+10 Ω/□. The results obtained are shown in Table 1.

(5) Evenness of Coating with Colorant

A colorant was prepared by the following method and used for the evaluation of evenness of colorant coating.

In 40 g of water was completely dissolved 0.1 g of sodium hydroxide (manufactured by Wako Pure Chemical Industries, Ltd.; reagent grade). The solution was heated to 50° C. on a water bath and 1 g of ethanol was added thereto. Subsequently, 0.5 g of tetrabromophenolsulfonphthalein (manufactured by Wako Pure Chemical Industries, Ltd.; reagent grade) as a dye was dissolved little by little in the solution with stirring. After completion of the addition, the resultant solution was stirred at 50° C. for 4 hours to prepare a dye solution.

In 1,060 g of water which was kept being stirred at 80° C. on a water bath were dissolved, little by little, 94.4 g of "Polyvinyl Alcohol 500" (manufactured by Wako Pure Chemical Industries, Ltd.; completely saponified PVA having an average degree of polymerization of about from 400 to 600 and a degree of saponification of 96 mol % or higher) and 23.6 g of "Polyvinyl Alcohol 1000" (manufactured by Wako Pure Chemical Industries, Ltd.; completely saponified PVA having an average degree of polymerization of about from 900 to 1,000 and a degree of saponification of 96 mol % or higher) as binders. After completion of the addition, the resultant solution was stirred at an elevated temperature of 90 to 95° C. for 2 hours to prepare a binder solution.

This binder solution was allowed to cool to room temperature. Thereto were added, with stirring, 230 g of water, 2.5 g of 2-butoxyethanol (manufactured by Wako Pure Chemical Industries, Ltd.; reagent grade; purity, >98%), and 3.5 g of the sodium salt of bis(2-ethylhexyl) sulfosuccinate as a surfactant. After this mixture was stirred for 2 hours, the dye solution prepared above was gradually added thereto with stirring. The resultant mixture was stirred for 30 minutes to prepare a colorant.

This colorant fluid was applied on the film of Example 1 with a Mayer bar coater (#8) in a thickness of about 18.3 μm and then dried at room temperature for 1 hour. Thus, a film having a surface coated with the colorant was obtained.

The coated surface was visually examined for unevenness of color, and evaluated in the following four grades.

4: Almost no coloring unevenness is observed.

3: Slight coloring unevenness is partly observed but is inconspicuous.

2: Conspicuous coloring unevenness is partly observed.

1: Considerably conspicuous coloring unevenness is observed throughout the surface.

The evenness of colorant coating in Example 1 was rated as 4. The results obtained are shown in Table 1.

(6) Color Density of Colored Surface

The color density of the colored surface obtained above was determined in terms of optical reflection density (Macbeth density) with a Macbeth densitometer (manufactured by Colmogen Inc., U.S.A.). The Macbeth density of the colored surface obtained in Example 1 was 0.22.

COMPARATIVE EXAMPLE 1

A film was produced and evaluated in the same manner as in Example 1, except that the first oxidation treatment and coating with the first surface modifier were omitted. The results obtained are shown in Table 1.

EXAMPLES 2 TO 4

Films were produced, surface-treated, and evaluated in the same manner as in Example 1, except that the second surface modifier was changed to (J2) applied in an amount of 0.04 g/m² on a dry basis, to (J3) applied in an amount of 0.24 g/m² on a dry basis, or to (J4) applied in an amount of 0.38 g/m² on a dry basis. The evaluation results obtained are shown in Table 2 together with important points for each Example.

EXAMPLE 5

A film was produced, surface-treated, and evaluated in the same manner as in Example 1, except that the amount of corona discharge treatment as the first oxidation treatment was changed to 20 W×min/m². The results obtained are shown in Table 2.

EXAMPLE 6

A film was produced, surface-treated, and evaluated in the same manner as in Example 1, except that the amount of corona discharge treatment as the first oxidation treatment was 2 changed to 180 W×min/m², and that the amount of first surface modifier G1 was changed to about 0.4 g/m² on a dry basis. The results obtained are shown in Table 2.

EXAMPLE 7

A film was produced, surface-treated, and evaluated in the same manner as in Example 1, except that unstretched five-layer laminate (P1) was subjected on both sides to flame treatment using "FLYNN F 3000 Direct Flame Plasma Treatment Apparatus", manufactured by FLYNN BURNER, and propane as a combustion gas at a line velocity of 40 m/min and an applied energy of 37,700 J/m², and that the surface modifier used before stretching was changed to G2 (applied in an amount of 0.3 g/m² on a dry basis). The results of evaluation of this film are shown in Table 3.

EXAMPLE 8

A film was produced in the same manner as in Example 7, except that the applied energy in the flame treatment as the first oxidation treatment was changed to 28,000 J/m² and the surface modifier used before stretching was changed to GI (applied in an amount of 0.23 g/m² on a dry basis). The evaluation results obtained are shown in Table 3.

EXAMPLE 9

A film was produced in the same manner as in Example 8, except that the flame treatment as the first oxidation treatment was conducted at an applied energy of 60,600 J/m² and a line velocity of 70 m/min. The evaluation results are shown in Table 3.

EXAMPLE 10

Production Example 2 for Resin Sheet (P2)

A five-layer laminate was obtained in the same manner as in Production Example 1 for producing transversely unstretched resin sheet (PI), except that an ethylene/propylene random copolymer having an MFR of 10 g/10 min was used in place of the polypropylene having an MFR of 4.0 g/10 min used in composition A' in Production Example 1.

A film was produced and evaluated in the same manner as in Example 1, except that the resin sheet obtained in Production Example 2 above was used as an unstretched resin sheet, and that the amount of corona treatment as the first oxidation treatment, the first surface modifier, and the amount of corona treatment as the second oxidation treatment were changed to 150 W×min/m², G3 (applied in an amount of 0.23 g/m² on a dry basis), and 80 W×min/m², respectively. The results of evaluation of this film are shown in Table 3.

EXAMPLE 11

The unstretched resin sheet shown below was used.
Production Example 3 for Transversely Unstretched Resin Sheet (P3)

Composition (C') consisting substantially of a mixture of polypropylene having a melt index (MFR) of 0.8 g/10 min and 15 wt % heavy calcium carbonate having an average particle diameter of 1.5 µm was kneaded with an extruder set at 250° C., extruded into a sheet, and then cooled with a cooler to obtain a single-layer unstretched sheet. This sheet was heated to 140° C. and stretched 4.5 times in the machine direction by means of rolls having different peripheral speeds. The stretched sheet was coated with surface modifier G1 in an amount of 0.23 g/m² on a dry basis under the same conditions as in Example 1 and then dried in a drying oven. In a tenter oven, the coated sheet was heated to 155° C. and then stretched 9 times in the transverse direction to obtain a biaxially stretched film having a thickness of 95 µm. This film was subjected to corona discharge treatment under the conditions of 80 W×min/m² and then coated with surface modifier J3 in an amount of 0.06 g/m² on a dry basis. The results of evaluation of this treated film are shown in Table 3.

EXAMPLE 12

The unstretched resin sheet shown below was used.
Production Example 4 for Transversely Unstretched Resin Sheet (P4)

The unstretched sheet consisting only of composition C' obtained in Production Example 3 for producing transversely unstretched resin sheet (P3) was subjected to corona discharge treatment under the same conditions as in Example 1 and then coated with first surface modifier G1 in an amount of 0.35 g/m² on a dry basis. After the coated sheet was dried in a drying oven, it was heated to 140° C. and stretched 5 times in the machine direction by means of rolls having different peripheral speeds to thereby obtain a lengthwise, i.e., uniaxially stretched single-layer sheet. This sheet was subjected to corona discharge treatment under the conditions of 80 W×min/m² and then coated with surface modifier J1 in an amount of 0.08 g/m² on a dry basis. The results of evaluation of this treated film are shown in Table 3.

COMPARATIVE EXAMPLES 2 TO 4

Films were produced, surface-treated, and evaluated in the same manner as in Example 1, except that the first oxidation treatment and coating with the first surface modifier were omitted, and that the second surface modifier was changed to J2, J3, and J4, respectively. The results obtained are shown in Table 4.

COMPARATIVE EXAMPLE 5

A laminated resin sheet was produced in the same manner as in Example 1. This sheet was subjected as the first oxidation treatment to corona discharge treatment in an amount of 5 W×min/m² and then coated with the first surface modifier. However, cissing occurred and an evenly coated surface did not obtained. Consequently, the subsequent evaluation was omitted. The results obtained are shown in Table 4.

COMPARATIVE EXAMPLE 6

A film was produced, surface-treated, and evaluated in the same manner as in Example 1, except that the amount of corona discharge treatment as the first oxidation treatment was changed to 300 W×min/m². The results obtained are shown in Table 4.

COMPARATIVE EXAMPLES 7 TO 9

Films were produced, surface-treated, and evaluated in the same manner as in Example 1, except that the resin sheet used was changed to P2, P3, and P, respectively, and that the first oxidation treatment and coating with the first surface modifier were omitted. The results obtained are shown in Table 5.

EXAMPLE 13

A film was produced in the same manner as in Example 1, except that the second oxidation treatment and coating with the second surface modifier were omitted. This film had a void content of 33%, and the evenness of colorant coating thereof was rated as 3. The colored surface had a Macbeth density of 0.18.

EXAMPLE 14

A film was produced in the same manner as in Example 8, except that the second oxidation treatment and coating with the second surface modifier were omitted, and that the surface modifier used before stretching was changed to G1 (applied in an amount of 0.2 g/m² on a dry basis). This film had a void content of 33%, and the evenness of colorant coating thereof was rated as 3. The colored surface had a Macbeth density of 0.19.

EXAMPLE 15

A film was produced in the same manner as in Example 1, except that coating with the second surface modifier was omitted. This film had a void content of 33%, and the evenness of colorant coating thereof was rated as 4. The colored surface had a Macbeth density of 0.23.

EXAMPLE 16

A film was produced in the same manner as in Example 8, except that coating with the second surface modifier was omitted, and that the surface modifier used before stretching was changed to G1 (applied in an amount of 0.2 g/m² on a dry basis). This film had a void content of 33%, and the evenness of colorant coating thereof was rated as 4. The colored surface had a Macbeth density of 0.22.

COMPARATIVE EXAMPLE 10

A film was produced in the same manner as in Example 13, except that the coating with a surface modifier before stretching was omitted. However, cissing occurred upon application of the colorant fluid, and the subsequent evaluation was hence omitted.

COMPARATIVE EXAMPLE 11

A film was produced in the same manner as in Example 13, except that the coating with surface modifier G1 before stretching was conducted without performing corona discharge treatment. However, cissing occurred upon application of the surface modifier, and the subsequent evaluation was hence omitted.

While the invention has been described in detail and with reference to specific embodiments thereof, it will be apparent to one skilled in the art that various changes and modifications can be made therein without departing from the spirit and scope thereof

TABLE 1

| Item | Example 1 | Comparative Example 1 |
|---|---|---|
| Unstretched resin sheet | P1 | P1 |
| Surface treatments before stretching | | |
| Kind of oxidation treatment | corona discharge | — |
| Amount of treatment (corona discharge: W × min/m², flame treatment: J/m²) | 100 | — |
| Surface modifier | G1 | — |
| Amount of surface modifier after drying (g/m²) | 0.23 | — |
| Surface treatments after stretching | | |
| Kind of oxidation treatment | corona discharge | corona discharge |
| Amount of treatment (corona discharge: W × min/m², flame treatment: J/m²) | 100 | 100 |
| Surface modifier | J1 | J1 |
| Amount of surface modifier after drying (g/m²) | 0.06 | 0.06 |
| Film Evaluation | | |
| Ink adhesion (in 5 grades) | 5 | 5 |
| Moisture resistance (in 5 grades) | 5 | 2 |
| Water resistance (in 5 grades) | 5 | 5 |
| Antistatic property: surface resistivity (Ω) | 2.5E + 10 | 3.2E + 10 |
| Evenness of coating with dye solution (in 4 grades) | 4 | 3 |
| Color density | 0.22 | 0.2 |
| Void content (%) | 33 | 33 |

TABLE 2

| | Item | Example 2 | Example 3 | Example 4 | Example 5 | Example 6 |
|---|---|---|---|---|---|---|
| Unstretched resin sheet | | P1 | P1 | P1 | P1 | P1 |
| Surface treatments before stretching | Kind of oxidation treatment | corona discharge | corona discharge | corona discharge | corona discharge | corona discharge |
| | Amount of treatment (corona discharge: W × min/m², flame treatment: J/m²) | 100 | 100 | 100 | 20 | 180 |
| | Surface modifier | G1 | G1 | G1 | G1 | G1 |
| | Amount of surface modifier after drying (g/m²) | 0.23 | 0.23 | 0.23 | 0.23 | 0.4 |
| Surface treatments after stretching | Kind of oxidation treatment | corona discharge | corona discharge | corona discharge | corona discharge | corona discharge |
| | Amount of treatment (corona discharge: W × min/m², flame treatment: J/m²) | 100 | 100 | 100 | 100 | 100 |
| | Surface modifier | J2 | J3 | J4 | J1 | J1 |
| | Amount of surface modifier after drying (g/m²) | 0.04 | 0.24 | 0.38 | 0.06 | 0.06 |
| Film Evaluation | Ink adhesion (in 5 grades) | 5 | 5 | 5 | 4 | 5 |
| | Moisture resistance (in 5 grades) | 4 | 4 | 4 | 4 | 5 |
| | Water resistance (in 5 grades) | 4 | 4 | 5 | 4 | 5 |
| | Antistatic property: surface resistivity (Ω) | 5.6E+9 | 8.1E+11 | 9.5E+11 | 2.2E+10 | 1.8E+10 |
| | Void content (%) | 33 | 33 | 33 | 33 | 33 |

TABLE 3

| Item | | Example 7 | Example 8 | Example 9 | Example 10 | Example 11 | Example 12 |
|---|---|---|---|---|---|---|---|
| Unstretched resin sheet | | P1 | P1 | P1 | P2 | P3 | P4 |
| Surface treatments before stretching | Kind of oxidation treatment | flame treatment | flame treatment | flame treatment | corona discharge | corona discharge | corona discharge |
| | Amount of treatment (corona discharge: W × min/m$^2$, flame treatment: J/m$^2$) | 37700 | 28000 | 60600 | 150 | 100 | 100 |
| | Surface modifier | G2 | G1 | G1 | G3 | G1 | G1 |
| | Amount of surface modifier after drying (g/m$^2$) | 0.3 | 0.23 | 0.23 | 0.4 | 0.23 | 0.35 |
| Surface treatments after stretching | Kind of oxidation treatment | corona discharge | corona discharge | corona discharge | corona discharge | corona discharge | corona discharge |
| | Amount of treatment (corona discharge: W × min/m$^2$, flame treatment: J/m$^2$) | 100 | 100 | 100 | 80 | 80 | 80 |
| | Surface modifier | J1 | J1 | J1 | J1 | J1 | J1 |
| | Amount of surface modifier after drying (g/m$^2$) | 0.06 | 0.06 | 0.06 | 0.06 | 0.06 | 0.08 |
| Film Evalution | Ink adhesion (in 5 grades) | 5 | 5 | 5 | 4 | 4 | 4 |
| | Moisture resistance (in 5 grades) | 5 | 5 | 5 | 4 | 4 | 4 |
| | Water resistance (in 5 grades) | 5 | 5 | 5 | 4 | 4 | 4 |
| | Antistatic property: surface resistivity (Ω) | 2.3E+10 | 5.7E+10 | 4.5E+10 | 3.5E+10 | 2.8E+10 | 1.1E+10 |
| | Void content % | 33 | 33 | 33 | 29 | 35 | 20 |

TABLE 4

| Item | | Comparative Example 2 | Comparative Example 3 | Comparative Example 4 | Comparative Example 5 | Comparative Example 6 |
|---|---|---|---|---|---|---|
| Unstretched resin sheet | | P1 | P1 | P1 | P1 | P1 |
| Surface treatments before stretching | Kind of oxidation treatment | — | — | — | corona discharge | corona discharge |
| | Amount of treatment (corona discharge: W × min/m$^2$, flame treatment: J/m$^2$) | — | — | — | 5 | 300 |
| | Surface modifier | — | — | — | G1 | G1 |
| | Amount of surface modifier after drying (g/m$^2$) | — | — | — | — | 0.23 |
| Surface treatments after stretching | Kind of oxidation treatment | corona discharge | corona discharge | corona discharge | — | corona discharge |
| | Amount of treatment (corona discharge: W × min/m$^2$, flame treatment: J/m$^2$) | 100 | 100 | 100 | — | 100 |
| | Surface modifier | J2 | J3 | J4 | — | J1 |
| | Amount of surface modifier after drying (g/m$^2$) | 0.04 | 0.24 | 0.38 | — | 0.06 |
| Film Evaluation | Ink adhesion (in 5 grades) | 2 | 1 | 1 | — | 4 |
| | Moisture resistance (in 5 grades) | 1 | 1 | 1 | — | 2 |
| | Water resistance (in 5 grades) | 1 | 1 | 1 | — | 2 |
| | Antistatic property: surface resistivity (Ω) | 4.1E+9 | 1.2E+12 | 9.1E+12 | — | 3.8E+10 |
| | Void content % | 33 | 33 | 33 | — | 33 |

TABLE 5

| Item | | Comparative Example 7 | Comparative Example 8 | Comparative Example 9 |
|---|---|---|---|---|
| Unstretched resin sheet | | P2 | P3 | P4 |
| Surface treatments before stretching | Kind of oxidation treatment | — | — | — |
| | Amount of treatment (corona discharge: W □ min/m$^2$, flame treatment: J/m$^2$) | — | — | — |
| | Surface modifier | — | — | — |
| | Amount of surface modifier after drying (g/m$^2$) | — | — | — |
| Surface treatments after stretching | Kind of oxidation treatment | corona discharge | corona discharge | corona discharge |
| | Amount of treatment (corona discharge: W □ min/m$^2$, flame treatment: J/m$^2$) | 100 | 100 | 100 |
| | Surface modifier | J1 | J1 | J1 |
| | Amount of surface modifier after drying (g/m$^2$) | 0.06 | 0.06 | 0.06 |
| Film Evaluation | Ink adhesion (in 5 grades) | 4 | 4 | 4 |
| | Moisture resistance (in 5 grades) | 2 | 2 | 2 |
| | Water resistance (in 5 grades) | 2 | 2 | 2 |
| | Antistatic property: surface resistivity (Ω) | 4.5E+10 | 2.3E+10 | 4.3E+10 |
| | Void content % | 29 | 35 | 20 |

This application is based on Japanese patent application Hei. 10-107178 filed in the Japanese Patent Office on Apr. 3, 1998, the entire contents of which are hereby incorporated by reference.

What is claimed is:

1. A process for treating a surface of a thermoplastic resin film comprising:
   a) subjecting the surface of a thermoplastic resin film to a first oxidation treatment;
   b) coating an oxidized surface of said thermoplastic resin film with a first surface modifier;
   c) stretching said thermoplastic resin film;
   d) subjecting a surface of said stretched thermoplastic resin film to a second oxidation treatment; and
   e) coating said oxidized surface with a second surface modifier.

2. The process of claim 1, wherein said thermoplastic resin film comprises a multilayered resin film obtained by stretching a base layer comprising a thermoplastic resin in the machine direction and then laminating a surface layer comprising a thermoplastic resin to at least one side of said base layer, and said stretching of step c) is in the transverse direction.

3. The process of claim 1, wherein said thermoplastic resin film comprises a multilayered resin film obtained by laminating a surface layer comprising a thermoplastic resin to at least one side of a base layer comprising a thermoplastic resin; and said stretching of step c) is in the machine direction.

4. The process of claim 1, wherein said thermoplastic resin film comprises a multilayered resin film comprising a base layer comprising from 40 to 100 wt % thermoplastic resin and from 60 to 0 wt % fine inorganic particles and a surface layer comprising from 25 to 100 wt % thermoplastic resin and from 75 to 0 wt % fine inorganic particles.

5. The process of claim 4, wherein said thermoplastic resin film has a void content as defined by the following equation of from 10 to 60%:

Void content (%)=$100 \times (\rho_0 - \rho)/\rho_0$ $\rho_0$: density of the unstretched resin film $\rho$: density of the stretched resin film.

6. The process of claim 1, wherein said thermoplastic resin is a polyolefin resin.

7. The process of claim 6, wherein said polyolefin resin is a propylene resin.

8. The process of claim 1, wherein said first and second oxidation treatments are each independently selected from the group consisting of corona discharge treatment, flame treatment, plasma treatment, glow discharge treatment, and ozone treatment.

9. The process of claim 1, wherein said first and second oxidation treatments are each independently a corona discharge treatment conducted at an energy of from 10 to 200 W×min/m² or flame treatment conducted at an energy of from 8,000 to 200,000 J/m².

10. The process of claim 1, wherein said first and second surface modifiers independently comprise a primer or a combination of a primer and an antistatic polymer.

11. The process of claim 2, wherein said thermoplastic resin is a polyolefin resin.

12. The process of claim 11, wherein said polyolefin resin is a propylene resin.

13. The process of claim 3, wherein said thermoplastic resin is a polyolefin resin.

14. The process of claim 13, wherein said polyolefin resin is a propylene resin.

15. A process for treating a surface of a thermoplastic resin film which comprises a multilayered resin film comprising a base layer comprising from 40 to 100 wt % polyolefin resin and from 60 to 0 wt % fine inorganic particles and a surface layer comprising from 25 to 100 wt % polyolefin resin and from 75 to 0 wt % fine inorganic particles, said process comprising subjecting a surface of said thermoplastic resin film to an oxidation treatment, subsequently coating said oxidized surface with a surface modifier, and then stretching said film.

16. A process for treating a surface of a thermoplastic resin film which comprises a multilayered resin film comprising a base layer comprising from 40 to 100 wt % polyolefin resin and from 60 to 0 wt % fine inorganic particles and a surface layer comprising from 25 to 100 wt % polyolefin resin and from 75 to 0 wt % fine inorganic particles, said process comprising subjecting a surface of said thermoplastic resin film to a first oxidation treatment, coating said oxidized surface with a surface modifier, subsequently stretching said film, and then subjecting a surface of said stretched film to a second oxidation treatment.

17. The process of claim 15, wherein said polyolefin resin is a propylene resin.

18. The process of claim 16, wherein said polyolefin resin is a propylene resin.

19. The process of claim 15, wherein said thermoplastic resin film has a void content as defined by the following equation of from 10 to 60%:

Void content (%)=$100 \times (\rho_0 - \rho)/\rho_0$ $\rho_0$: density of the unstretched resin film $\rho$: density of the stretched resin film.

20. The process of claim 16, wherein said thermoplastic resin film has a void content as defined by the following equation of from 10 to 60%:

Void content (%)=$100 \times (\rho_0 - \rho)/\rho_0$ $\rho_0$: density of the unstretched resin film $\rho$: density of the stretched resin film.

* * * * *